US007414607B2

(12) United States Patent
Washio et al.

(10) Patent No.: US 7,414,607 B2
(45) Date of Patent: Aug. 19, 2008

(54) DISPLAY DEVICE

(75) Inventors: Hajime Washio, Sakurai (JP); Kazuhiro Maeda, Nara (JP); Mamoru Onda, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 594 days.

(21) Appl. No.: 10/733,395

(22) Filed: Dec. 12, 2003

(65) Prior Publication Data

US 2004/0119675 A1 Jun. 24, 2004

(30) Foreign Application Priority Data

Dec. 13, 2002 (JP) ............................ 2002-363037

(51) Int. Cl.
*G09G 3/36* (2006.01)
*G09G 5/00* (2006.01)
*G06F 3/038* (2006.01)

(52) U.S. Cl. ...................................................... 345/100

(58) Field of Classification Search ................. 345/100, 345/87, 98–99, 204
See application file for complete search history.

(56) References Cited

U.S. PATENT DOCUMENTS 5,808,596 A * 9/1998 Kim ............................ 345/98
6,115,020 A * 9/2000 Taguchi et al. ................ 345/99
6,320,566 B1 * 11/2001 Go .............................. 345/99
2002/0075249 A1 6/2002 Kubota et al.
2003/0038664 A1 * 2/2003 Ootake et al. ............... 327/295

FOREIGN PATENT DOCUMENTS

JP 01-241146 9/1989
JP 11-031747 2/1999

* cited by examiner

*Primary Examiner*—Amr Awad
*Assistant Examiner*—Stephen G Sherman
(74) *Attorney, Agent, or Firm*—Nixon & Vanderhye P.C.

(57) ABSTRACT

In a structure in which a plurality of signals related to each other are supplied to a driving circuit in such a manner that at least one of the signals is supplied also to the other circuit, the present invention prevents change of phase relation between the plural signals due to difference in wiring load, without directly processing the signals with higher power consumption. The first and second clock signals SCK1 and SCK2 are supplied to the first data signal line driving circuit SD1, while the first clock signal SCK1 is also supplied to the second data signal line driving circuit SD2 in parallel. The wirings 1 and 2 for the respective signals are adjusted to have equal wiring load with a dummy wiring 2 provided in the wiring 2, for solving uneven wiring load caused by difference of leading manner, the dummy wiring 2 constituting an additional capacitor section 7, together with a liquid crystal layer and a counter electrode.

25 Claims, 11 Drawing Sheets

DISPLAY DEVICE

This Nonprovisional application claims priority under 35 U.S.C. § 119 (a) on Patent Application No. 2002/363037 filed in Japan on Dec. 13, 2002, the entire contents of which are hereby incorporated by reference.

FIELD OF THE INVENTION

The present invention relates to a display device including a scanning signal line driving circuit for driving a plurality of scanning signal lines and a data signal line driving circuit for driving a plurality of data signal lines intersecting with the scanning signal lines, the display device being suitably used for such as an active-matrix-type liquid crystal display device.

BACKGROUND OF THE INVENTION

There has been conventionally known a liquid crystal display device driven by an active matrix manner, as one type of display devices. Note that, the present specification describes a liquid crystal display device as an example of the display device according to the present invention; however, the present invention is not limited to this kind of display device but may be used for other types of display device.

As shown in FIG. 10, the active-matrix type liquid crystal display device includes an pixel array ARY, and a scanning signal line driving circuit GD and a data signal line driving circuit SD.

The pixel array ARY includes a plurality of scanning signal lines GL (1) through GL (j) and a plurality of data signal lines SL (1) through SL (i) intersecting with each other, and each compartment defined by two adjacent scanning signal lines GL (hereinafter referred to as GL to specify an arbitrary one, or also as a generic name) and two adjacent data signal lines SL (hereinafter referred to as SL to specify an arbitrary one, or also as a generic name) is provided with a pixel PIX. Thus, the pixels PIX are disposed in a matrix manner.

The data signal line driving circuit SD mainly includes a shift register and a sampling circuit, and is supplied with a start pulse signal SSP and a clock signal SCK as control signals from an external circuit (not shown), which also supplies an image signal VIDEO to the data signal line driving circuit SD. When the start pulse SSP is supplied, the data signal line driving circuit SD samples the supplied image signal VIDEO in synchronism with the clock signal SCK by using the clock signal as a timing signal, and then amplifies the image signal as required before writing it into the data signal lines SL (1) through SL (i)

The scanning signal line driving circuit GD mainly includes a shift register, and is supplied with a start pulse GSP and a clock signal GCK as control signals from an external circuit (not shown). When the start pulse signal GSP is supplied, the scanning signal line driving circuit GD drives the scanning signal lines GL (1) through GL(j) by sequentially selecting these signal lines in synchronism with the clock signal GCK by using the clock signal as a timing signal. With this operation, a switching element (described later) provided in the pixel PIX is turned on or off, so that the image signal (data) written in the data signal line SL is written to the pixel PIX, and is held in the pixel PIX.

With such a display device, the applicant of the present invention has proposed a technique in which at least one of the data signal line driving circuit SD and the scanning signal line driving circuit GD is constituted of a plurality of driving circuits, which are driven either independently or together (see Patent Publication 1).

With this technique, it is possible to switch the driving circuits for driving the pixel array, according to the type of supplied image or the usage environment. This enables image display with an optimal display format. Power consumption can be reduced as well.

For example, in case of carrying out both monochrome display and color display with a single display device, monochrome display is performed by processing monochrome data by a processing circuit for color display. However, in this manner, monochrome display consumes the same quantity of power as that for color display, and therefore there are no advantages in carrying out monochrome display. This can be overcome by the arrangement in which a plurality of driving circuits is provided. By separately installing driving circuits for monochrome display and color display, power consumption can be reduced to that only required for the monochrome display.

Further, a plurality of driving circuits enables overwriting of images by performing writing of image signals with some time differences, thus realizing superimpose display without externally processing the image signals. [Patent Publication 1]

Japanese Laid-Open Patent Publication, Tokukai 2002-32048(published on Jan. 31, 2002)

[Problems to be Solved by the Invention]

As described above, the applicant of the present invention has proposed a structure in which a data signal line driving circuit or a scanning signal line driving circuit is constituted of a plurality of driving circuits which are driven either independently or together.

As a possible modification, this structure could be arranged so that one of the plurality of driving circuits are supplied with two-systems of clock signals, and the remaining driving circuits are supplied with one system of clock signals, for example.

More specifically, for example, in an arrangement in which two data signal line driving circuits are provided on both ends of the data signal lines by being connected to each other via the data signal lines, one of the data signal line driving circuits includes two-systems of shift registers and uses two-systems of clock signals for each shift register, while the other data signal line driving circuit includes only one system of shift register and uses only one of the two systems of clock signals.

In this case, to simplify the structure of an external interface, the clock signal to be shared by the two data signal line driving circuits is supplied in common to these data signal line driving circuits. However, in this case, there arises a shift in the sampling timing of image signal in the data signal line driving circuit using two systems of clock signals. This causes a problem of deterioration of display quality.

Such shifting is caused by a difference of wiring loads due to the different routing of the wirings supplying the two-systems of clock signals. More specifically, as shown in FIG. 11, a first clock signal ck1 is supplied to both a first data signal line driving circuit SD1 provided on the side of a signal input section 103, and a second data signal line driving circuit SD2 provided on the opposite end, while a second clock signal ck2 is supplied only to the first data signal line driving circuit SD1. A wiring 100 for the first clock signal ck1 supplied to both of the first and second data signal driving circuits SD1 and SD2 is longer than a wiring 101 for the second clock signal ck2 supplied only to the first data signal line driving circuit SD1. The wiring 100 therefore has a greater wiring load than the wiring 101, and accordingly the wiring load is different between the wiring 100 and wiring 101.

As shown in FIG. 12, assuming that the wiring 100 and the wiring 101 are respectively supplied with the first clock signal ck1 and the second clock signal ck2 opposite in phase to each other. In this case, the first clock signal ck1 supplied to the wiring 100 with greater wiring load gets behind of the second clock signal ck2. Accordingly even when the wiring 100 and the wiring 101 are at substantially the same distance from the signal input section 103, the phase relation between the first clock signal ck1 supplied through the wiring 100 and the second clock signal ck2 supplied through the wiring 101 changes. In the data signal line driving circuit SD1, the change of phase relation between the respective clock signals causes a shift in the sampling timing of the image signal.

As one possible solution for such a case, the respective clock signals ck1 and ck2 could be adjusted beforehand in an external circuit where the respective clock signals are created, so as to cancel such a phase difference due to the difference in wiring load between the wiring 100 and the wiring 101.

However, when the value of correction time is 25 ns for example, the external circuit requires a source clock (system clock) of not less than 20 Mhz, and causes an increase of power consumption. In recent years, the foregoing display devices have been often used for mobile devices, and therefore, the source clock tends to be reduced for realizing low power consumption. Therefore, there are some difficulties to adopt the foregoing technique of correcting the phase difference in the external circuit.

Further, in case of a liquid crystal display device, the wiring load tend to depend on a capacitance formed by the wiring, a counter electrode, and a liquid crystal layer (dielectric substance) which is held between the wiring and the counter electrode. Therefore, the wiring load also changes depending on the material or thickness of the liquid crystal layer, and if the difference were to be corrected by an external circuit, correction level have to be adjusted for each display panel, thus increasing costs.

SUMMARY OF THE INVENTION

The present invention is made in view of the foregoing conventional problems, and an object is to provide a display device realizing desirable display quality by preventing influence of difference in leading manner of wiring and without increasing power consumption, even in an arrangement in which a plurality of signals related to each other, such as a clock signal of plural systems, are supplied to a driving circuit by using different wirings for the respective plural signals in order to simplify the structure of external interface, for example, in such a manner that a part of the signals is singly supplied, and the other part is supplied also to the other circuit.

In order to solve the foregoing problems, a display device according to the present invention includes: a scanning signal line driving circuit for driving scanning signal lines; and a data signal line driving circuit for driving data signal lines intersecting the scanning signal lines, at least one of the scanning signal line driving circuit and the data signal line driving circuit is supplied with at least first and second signals, the first signal being supplied in parallel to a circuit other than the driving circuit supplied with the first and second signals, the display device further comprising wiring load adjustment section for equalizing wiring load of the second signal which is supplied to the driving circuit, and of wiring load of the first signal which is supplied in parallel to the driving circuit and the other circuit.

The other circuit may be such as driving circuits for driving the scanning signal lines or the data signal lines. The first and second signals may be clock signals of plural systems, or digital image signals constituted of a plurality of bits, and are divided into at least two bit groups.

For example, as a typical arrangement for the structure in which two data signal line driving circuits are provided on both sides of data signal lines by being connected to each other through the data signal lines, one of the two data signal line driving circuits are supplied with two-systems clock signal, and the other driving circuit is supplied with one system clock signal.

In this case, to simplify the structure of an external interface, one clock signal is often supplied in parallel to the two data signal line driving circuits. However, in this case, there arises difference in wiring load between the first clock signal and the second clock signal in the data signal line driving circuit using two clock signal, i.e., the first clock signal (first signal) and the second clock signal (second signal) which is singly supplied, thus causing a problem of unevenness of signal delays. Such unevenness of signal delay changes phase relation between the first and second signal clocks from the optimal relation determined upon designing of the device. This change induces unevenness of sampling timing of image signals in the data signal line driving circuit, thus decreasing display quality.

As one possible solution for such a case, the respective clock signals are previously adjusted in an external circuit where the respective clock signals are created, so as to cancel such change of phase relation due to difference in wiring load between the first and second clock signals. However, as described, this arrangement requires a source clock (system clock) having significantly high frequency in the external circuit, thus causing an increase of power consumption. This increase of power consumption will be a serious problem for a display device used in a mobile device.

In view of this problem, as described, the present invention provides wiring load adjustment section for equalizing wiring load of the second signal which is supplied to the driving circuit, and of wiring road of the first signal which is supplied in parallel to the driving circuit and the other circuit.

With the foregoing arrangement, the wiring load of the first clock signal (first signal) supplied to both of the two data signal line driving circuits, and the wiring load of the second clock signal (second signal) singly supplied to one data signal line driving circuit can be adjusted to be even without the foregoing method of correcting the first and second signal clocks in an external circuit by using higher power consumption. Thus, it is possible to keep difference in delay time between the first and second clock signals within an allowable range. Consequently, sampling of image signal can be properly carried out in the data signal line driving circuit using both the first and second clock signals, thus improving display quality.

The foregoing explanation uses a data signal line driving circuit as one example; however, if the scanning signal line driving circuit is supplied with plural systems of clock signal, the foregoing change in phase relation between the clock signals of respective systems also causes unwanted influence, which is unevenness in selection timing of scanning signal lines. However, a clock signal in the scanning signal line driving circuit has a lower frequency than that of a clock signal in the data signal line driving circuit, and therefore the change in phase relation causes less influence in a scanning signal line driving circuit than that in a data signal line driving circuit. In this view, the present invention is more effective for the data signal line driving circuit.

In a typical structure having a plurality of data signal line driving circuits or a plurality of scanning signal line driving circuits, in order to simplify the structure of an external interface, the first clock signal (first signal) of one system, which is one of the first and second clock signals of two systems used in one of the driving circuits, is supplied in parallel to the other circuit. However, in this case, there arises unevenness of signal delay between the first clock signal (first signal) supplied in parallel to both of two driving circuits and the second clock signal (second signal) which is singly supplied, due to unevenness in wiring load between these two clock signals. Such unevenness in signal delay further causes change in phase relation between the first and second clock signals, thus decreasing display quality. Further, when the respective clock signals are previously corrected in an external circuit so as to cancel such change of phase relation, there arises an increase of power consumption.

However, by thus providing the wiring load adjustment section for equalizing wiring load of the first clock signal (first signal) supplied to both of the two data signal line driving circuits, and wiring load of the second clock signal (second signal) singly supplied to one data signal line driving circuit, it is possible to suppress difference in signal delay between the first and second clock signals within an allowable range without the foregoing method of correcting the first and second signal clocks in an external circuit by using higher power consumption, so that the proper phase relation between the first and second clock signals can be maintained, thus maintaining desirable display quality.

More specifically, it is possible to provide a display device realizing desirable display quality by preventing influence of difference in leading manner of wiring and without increasing power consumption, even in an arrangement in which a plurality of signals related to each other, such as a clock signal of plural systems, are supplied to a driving circuit by using different wirings for the respective plural signals in order to simplify the structure of external interface, for example, in such a manner that a part (second signal) of the signals is singly supplied, and the other part (first signal) is supplied also to the other circuit.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8(*b*) is a drawing illustrating a structure of a capacitor section constituting wiring load adjustment section.

FIG. 8(*c*) is a drawing illustrating wiring load adjustment section constituted of semiconductor layer of a thin film transistor.

FIG. 9(*b*) is a plan view illustrating another example position of a capacitor constituting wiring load adjustment section by forming dummy wiring.

DESCRIPTION OF THE EMBODIMENTS

One embodiment of the present invention will be described below with reference to FIGS. 1 through 9(*b*).

Present embodiment uses an active-matrix-type liquid crystal display device as an example of the display device of the present invention.

Figure 2:
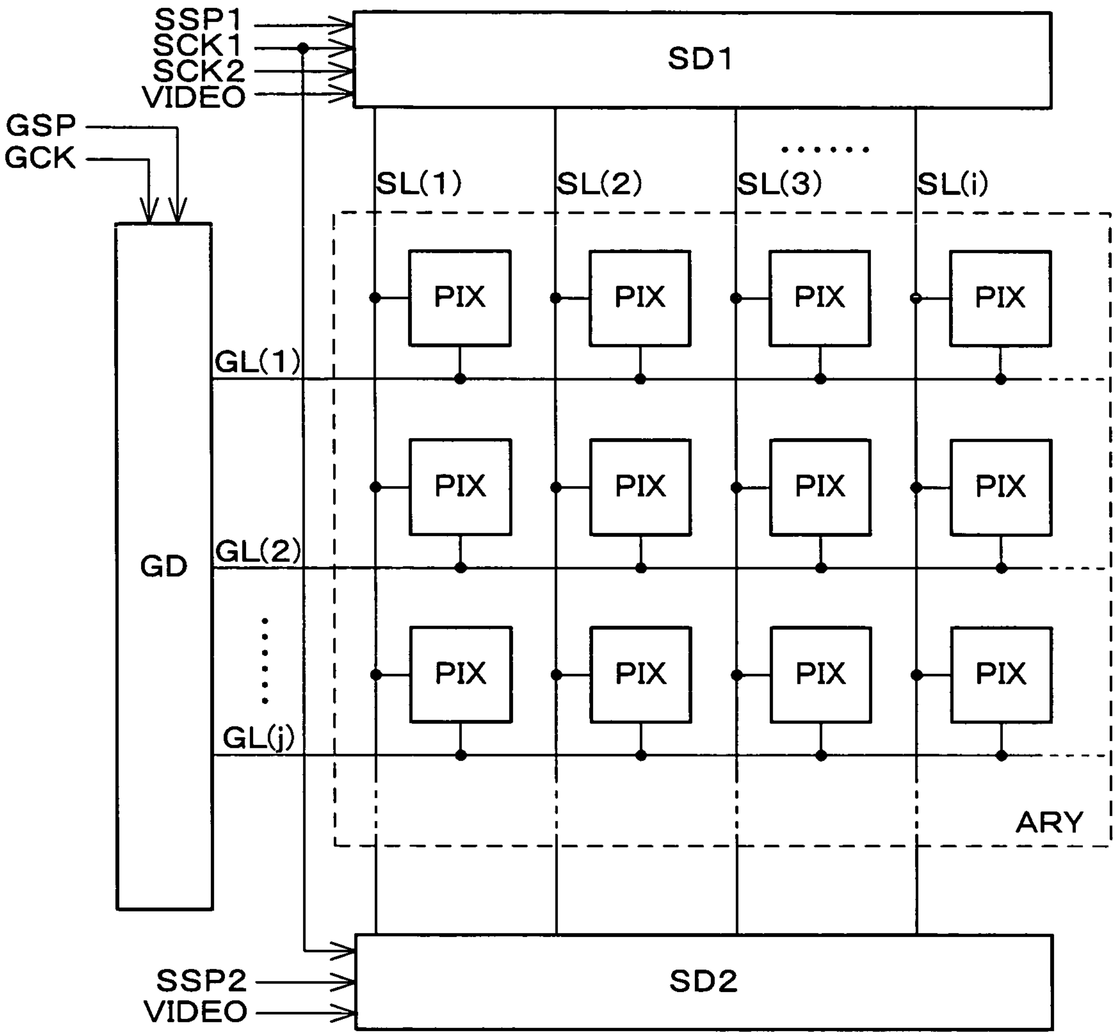
FIG. 2 is a block diagram schematically illustrating an arrangement of the foregoing liquid crystal display device.

As shown in FIG. 2, the active-matrix-type liquid crystal display device according to the present invention includes a pixel array ARY, a scanning signal line driving circuit GD1, and two (first and second) data signal line driving circuit SD1 and SD2 which are respectively provided on both sides of the pixel array ARY.

The pixel array ARY includes a plurality of scanning signal line GL (1) through GL (j) and a plurality of data signal lines SL (1) through SL (i) intersecting with each other, and each square created by two adjacent scanning signal lines GL and two adjacent data signal lines SL is provided with a pixel PIX. Thus, the pixels PIX are aligned in a matrix manner.

The first and second data signal line driving circuits SD1 and SD2 are both mainly made up of a shift register and a sampling circuit. The first data signal line driving circuit SD1 is supplied with a start pulse signal SSP1 and two systems of clock signal: a first and second clock signals SCK1 and SCK2 as control signals from an external circuit (not shown), which also supplies an image signal VIDEO to the first data signal line driving circuit SD1. The second data signal line driving circuit SD2 is supplied with as control signals a start pulse SSP2 and the first clock signal SCK1 which is also supplied to the first data signal line driving circuit SD1, from an external circuit (not shown), which also supplies an image signal VIDEO to the second data signal line driving circuit SD2.

The structure and operation of the first and second data signal line driving circuits SD1 and SD2 will be explained later in detail with reference to FIGS. 4 through 7. Briefly, the two data signal line driving circuits SD1 and SD2 are provided on both ends of the data signal lines SL(1) through SL(i), i.e., having these data signal lines therebetween. This structure allows both of the data signal line driving circuits SD1 and SD2 to drive the data signal lines SL(1) through SL(i).

The scanning signal line driving circuit GD mainly includes a shift register, and supplied with a start pulse signal GSP and a clock signal GCK as control signals from an external circuit (not shown). When the start pulse signal GSP is supplied, the scanning signal line driving circuit GD drives the scanning signal lines GL(1) through GL(j) by sequentially selecting these signal lines in synchronism with the clock signal GCK by using the clock signal as a timing signal. With this operation, a switching element (described later) provided in the pixel PIX is turned on or off, so that the image signal (data) written in the data signal line SL is written to the pixel PIX, and is held in the pixel PIX.

Figure 3:
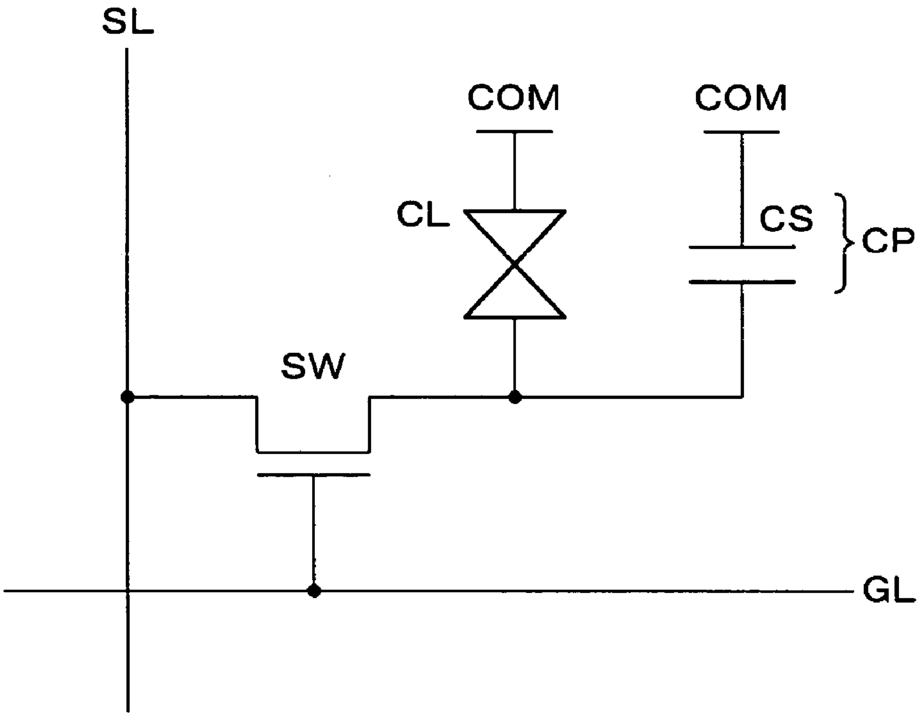
FIG. 3 is an equivalent circuit diagram illustrating an arrangement of a pixel of the foregoing liquid crystal display device.

As shown in FIG. 3, the pixel PIX is constituted of a field-effect-type thin film transistor SW as an active element, and a pixel capacitor CP. The pixel capacitor CP includes a liquid crystal capacitor CL, and an auxiliary capacitor CS which is additionally provided when required. One of the electrodes of the liquid crystal capacitor CL constituting the pixel capacitor CP and one of the electrodes of the auxiliary capacitor CS are connected to the data signal line SL via the drain or source of the thin film transistor SW as an active element. Further, the gate of the thin film transistor SW is connected to the scanning signal line GL. The other electrode of the liquid crystal capacitor CL and the other electrode of the auxiliary capacitor are connected to a common counter electrode COM, which is used for all pixels, via respective electrode lines. Further, The liquid crystal modulates its transmittance or reflectance by a voltage applied to the liquid crystal capacitors CL of the respective pixels, so as to perform image display.

The following will explain an example of the structure and operation of the first and second data signal line driving circuits SD1 and SD2 with reference to FIGS. 4 through 7. In this example, the two data signal line driving circuits SD1 and SD2 are a high-resolution data signal line driving circuit and a low-resolution data signal line driving circuit, respectively, which are individually driven.

Figure 4:
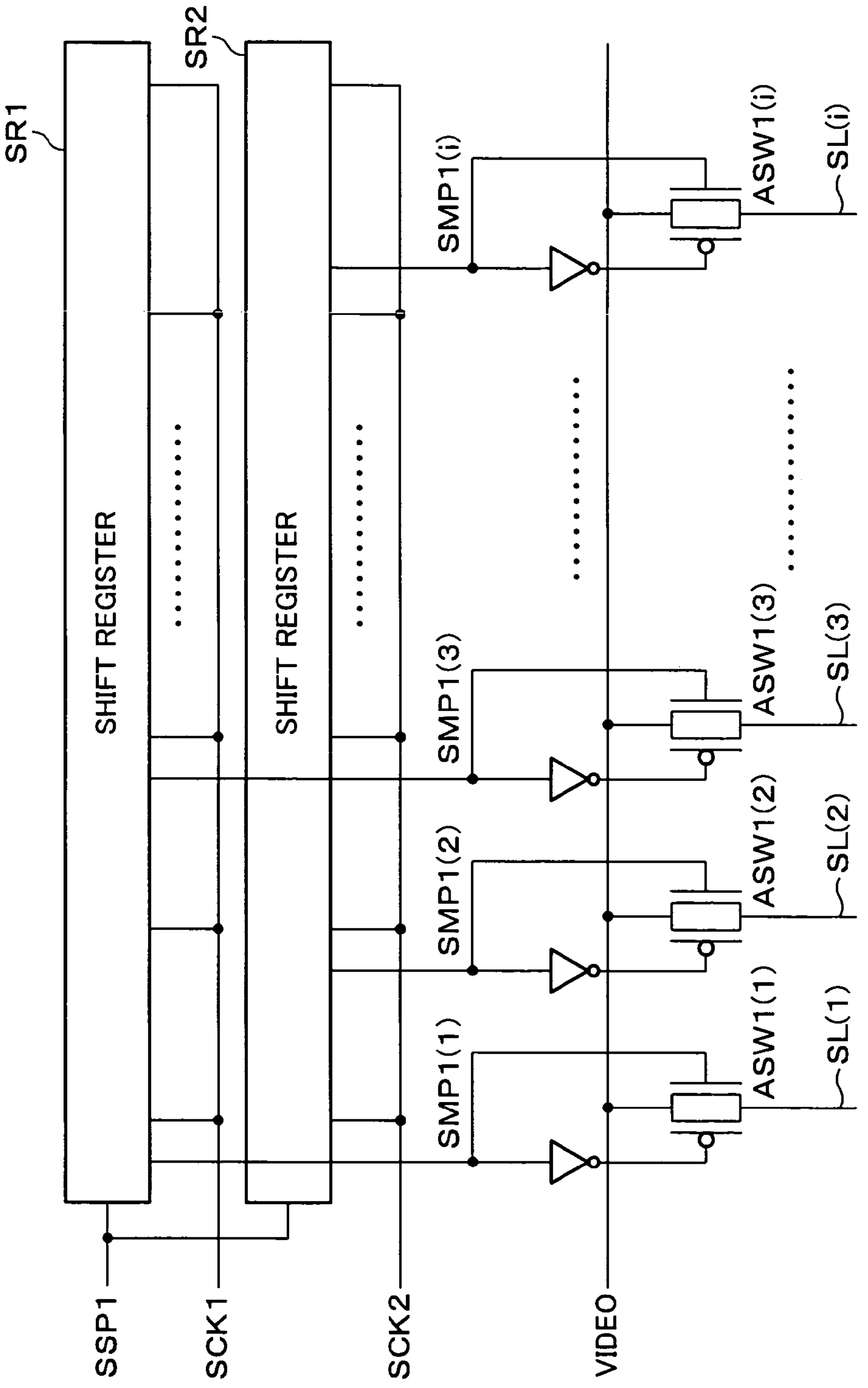
FIG. 4 is a circuit block diagram illustrating an arrangement example of a first data signal line driving circuit of the foregoing liquid crystal display device.

FIG. 4 shows a circuit arrangement of the first data signal line driving circuit SD1 disposed in the upper part of FIG. 2. The first data signal line driving circuit SD1 is a high-resolution data signal line driving circuit, and includes a two-system shift registers SR1 and SR2 and analog switches ASW1(1) through ASW1(i) which are supplied with each output of the two-system shift registers SR1 and SR2, so as to sample an image signals VIDEO which are separately supplied. These analog switches ASW1(1) through ASW(i) constitute a sampling circuit.

The shift register SR1 is supplied with a start pulse signal SSP1 and the first clock signal SCK1. Then, the shift register SR1 sequentially outputs sampling signal SMP1(1), SMP1 (3), . . . SMP1(i−1), which are supplied to the analog switches ASW1(1), ASW1(3) through ASW1(i−1) and sequentially turn on these switches. While the analog switches ASW1(1), ASW1(3) through ASW1(i−1) are turned on, the image signals VIDEO having been separately supplied to these switches are sampled, and outputted to corresponding data signal lines SL(1), SL(3) through SL(i−1).

Meanwhile, the shift register SR2 is supplied with a start pulse signal SSP1 and the second clock signal SCK2. Then, the shift register SR2 sequentially outputs sampling signal SMP1(2), SMP1(4), . . . SMP1(i), which are supplied to the analog switches ASW1(2), ASW1(4) through ASW1(i) and sequentially turn on these switches. While the analog switches ASW1(2), ASW1(4) through ASW1(i) are turned on, the image signals VIDEO having been separately supplied to these switches are sampled, and outputted to corresponding data signal lines SL(2), SL(4) through SL(i).

Figure 5:
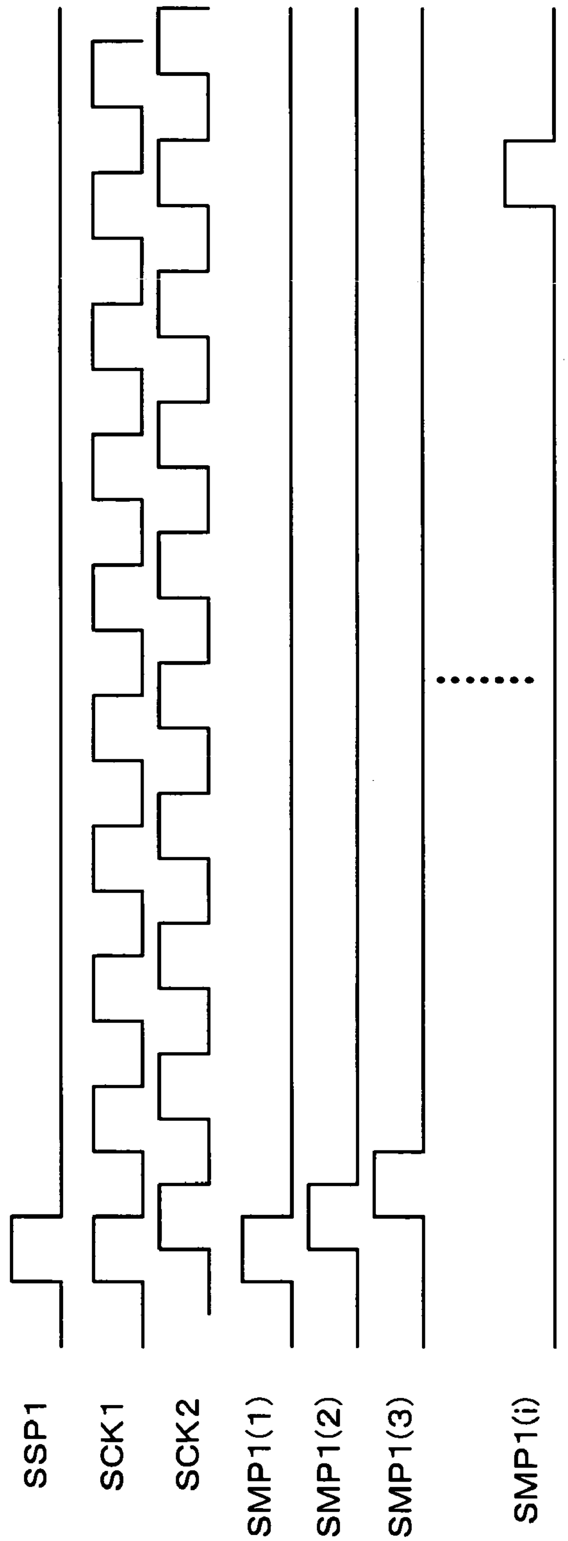
FIG. 5 is a timing chart for respective signals related to the first data signal line driving circuit of FIG. 4.

FIG. 5 shows a timing chart for the respective signals related to the first data signal line driving circuit SD1. The timings of the first clock signal SCK1 and the second clock signal SCK2 differ from each other by ¼ of the period. When the start pulse signal SSP1 is supplied to the shift register SR1 and the shift register SR2, the shift registers SR1 and SR2 outputs sampling signals SMP1(1), SMP1(2), . . . SMP1(i) in synchronism with the first clock signal SCK1 or the second clock signal SCK2, which have been supplied thereto.

Figure 6:
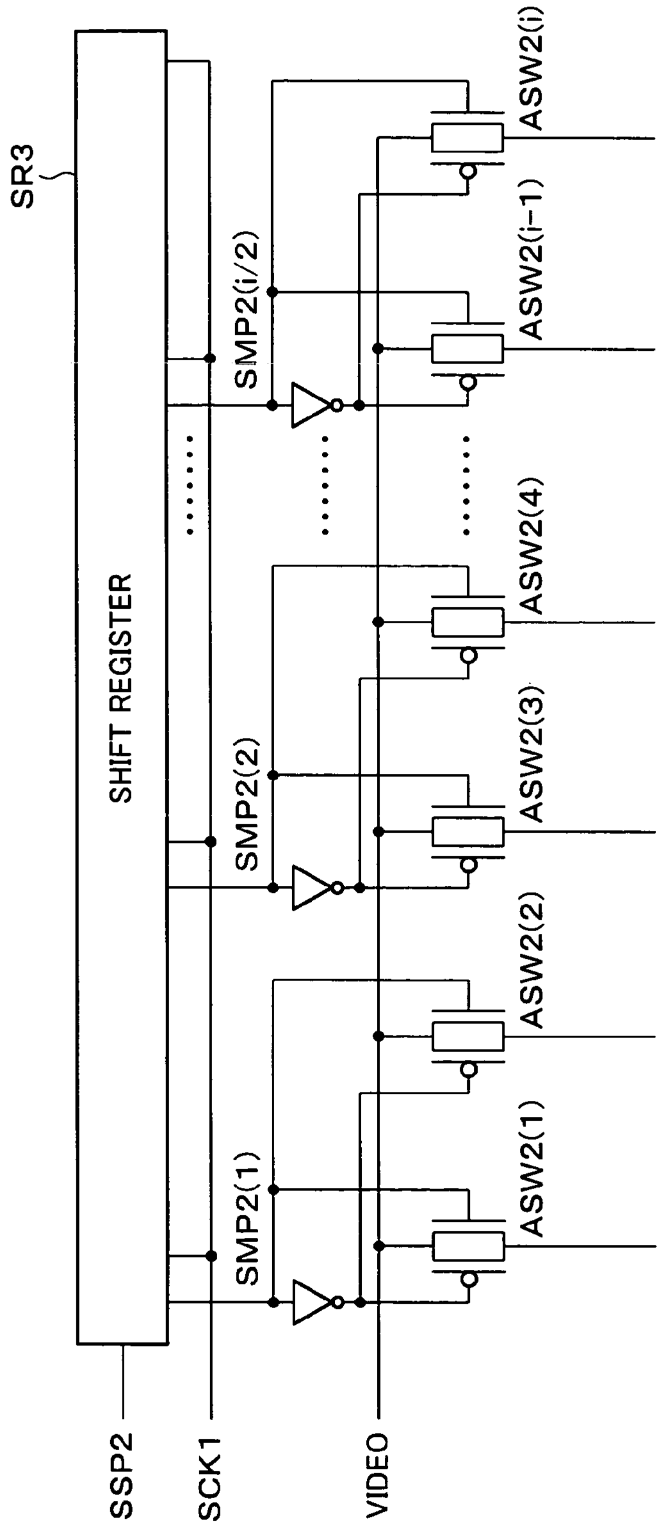
FIG. 6 is a circuit block diagram illustrating an arrangement example of a second data signal line driving circuit of the foregoing liquid crystal display device.

Meanwhile, FIG. 6 shows a circuit arrangement of the second data signal line driving circuit SD2 disposed in the lower part of FIG. 2. The second data signal line driving circuit SD2 is a low-resolution data signal line driving circuit, and includes only a shift register SR3, which is supplied with a start pulse signal SSP2 and the first clock signal SCK1.

The shift register SR3 sequentially outputs sampling signal SMP2(1), SMP2(2), . . . SMP2(i/2), which are supplied to the analog switches ASW2(1), ASW2(2) through ASW2(i) and sequentially turn on these switches by turning on two adjacent switches at a time. While the analog switches ASW2(1), ASW2(2) through ASW2(i) are turned on, the image signals VIDEO having been separately supplied to these switches are sampled, and outputted to corresponding two adjacent ones of data signal lines SL(1), SL(2) through SL(i).

Figure 7:
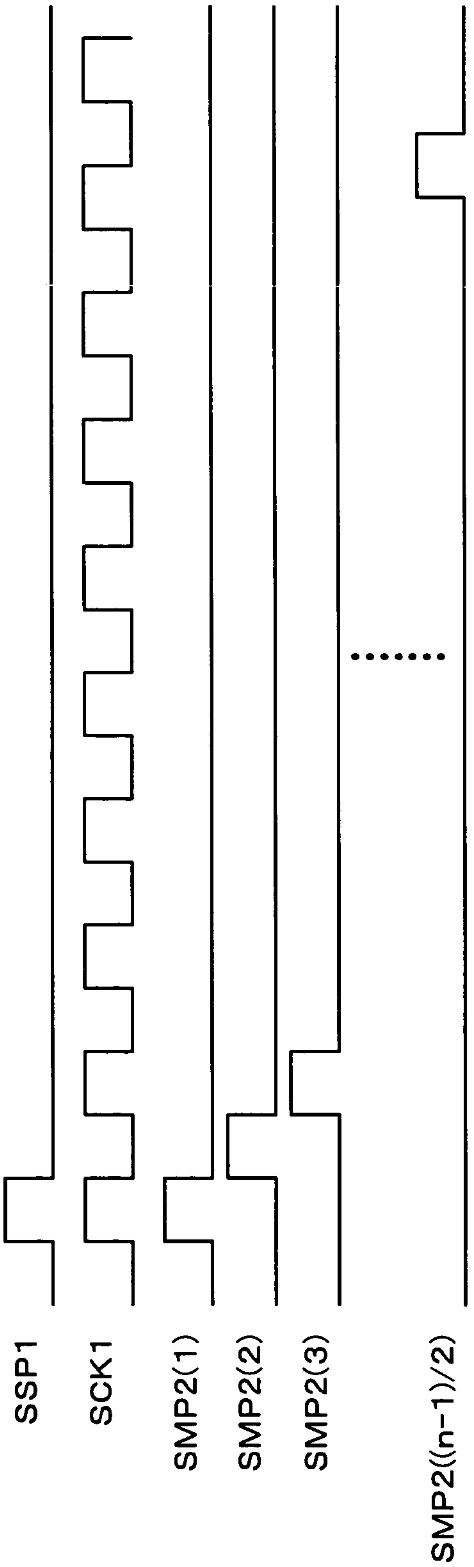
FIG. 7 is a timing chart for respective signals related to the second data signal line driving circuit of FIG. 6.

FIG. 7 shows a timing chart for the respective signals related to the second data signal line driving circuit SD2. When the start pulse signal SSP2 is supplied to the shift register SR3, the shift registers SR3 outputs sampling signals SMP2(1), SMP2(2), . . . SMP2(i/2) in synchronism with the first clock signal SCK1, which have been supplied thereto.

As described, in the second data signal line driving circuit SD2, two analog switches are simultaneously controlled so that the image signals VIDEO are supplied in parallel to two adjacent ones of the data signal lines SL. Accordingly, resolution upon image display becomes half of the case where image display on the pixel array ARY is performed with the first data signal line driving circuit SD1.

Incidentally, in the foregoing structure having the first and second data signal line driving circuits SD1 and SD2, the first clock signal (first signal) SCK1 as a common signal of the two data signal line driving circuits are supplied in parallel to these data signal driving circuits SD1 and SD2. With this arrangement, the structure of external interface can be simplified compared to the structure where the first clock signal SCK1 is individually supplied to the respective data signal line driving circuits SD1 and SD2.

Note that, in the arrangement where the first clock signal SCK1 is supplied in parallel to the two data signal line driving circuits SD1 and SD2, the first clock signal SCK1 is supplied to both of those data signal line driving circuits SD1 and SD2 even when only the first data signal line driving circuit SD1 is driven. However, since the start pulse SSP2 is not supplied, the second data signal line driving circuit SD2 will not be in operation.

However, as described above, when the first clock signal SCK1 is supplied in parallel to both of the signal line driving circuits with the foregoing arrangement, there arises a problem of difference in signal delay quantity between these two clock signals in the data signal line driving circuit SD1, which uses both the first and second clock signals SCK1 and SCK2, due to difference in wiring load between the first clock signal SCK1 and the second clock signal (second signal) SCK2 which is singly supplied. This difference in signal delay quantity further changes phase relation between these clock signals. With this change in the phase relation, the sampling timings of the image signal VIDEO in the first data signal line driving circuit SD1 become uneven, thus decreasing display quality. Further, when the clock signals are corrected in an external circuit so as to cancel the difference in the phase relation, power consumption will increase.

Figure 1:
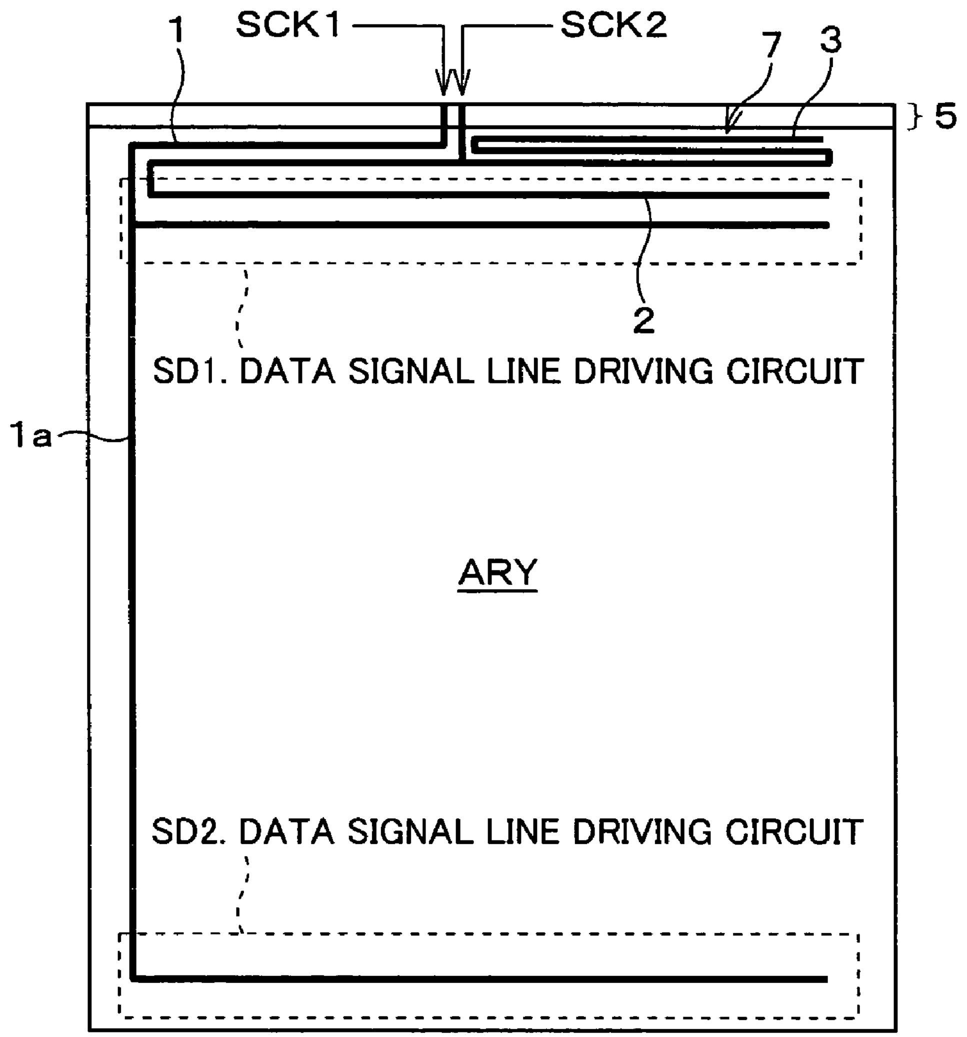
FIG. 1 is a plan view schematically illustrating the main part of wiring of a liquid crystal display device provided with dummy wiring, according to one embodiment of the present invention.

As shown in FIG. 1, the present embodiment solves this problem by providing dummy wiring 3 on wiring 2 used for supplying the second clock signal SCK2 which is singly supplied. This arrangement offers equal wiring load for wiring 1 used for the first clock signal SCK1 supplied to both of the data signal line driving circuits, and for the wiring 2 used for the second clock signal SCK2 singly supplied. This adjustment is based on adjustment of time constants of the respective wirings 1 and 2, more specifically, adjustment of the time constant τ=capacitance C*resistance R (τ=CR), as described above. This adjustment of time constant for offering equal wiring load of the wiring 2 to that of wiring 1 can be easily carried out by equalizing time constants of the respective wirings, which are given by the approximate expression of time constant τ.

Figure 8:
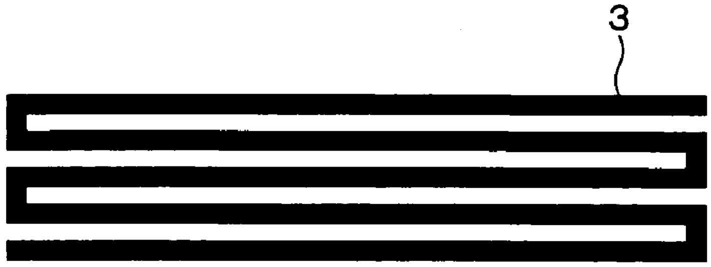
FIG. 8(*a*) is a magnified drawing illustrating an example of dummy wiring.
Figure 8:
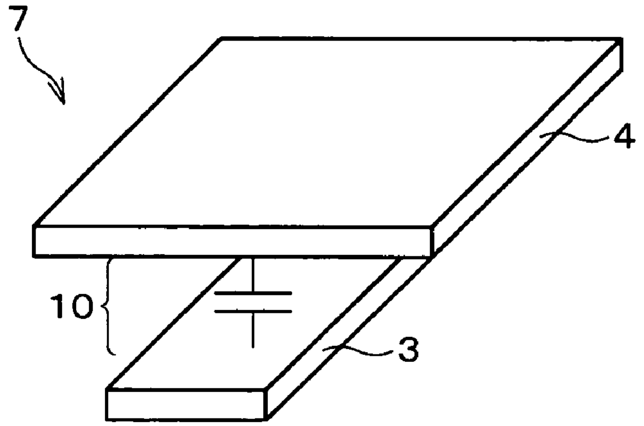
Figure 8:
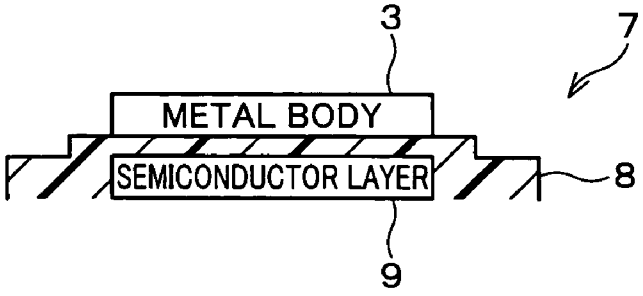

More specifically, the dummy wiring 3 is formed in a fanfold shape on vacant area closer to the signal input section 5 on the end portion of the substrate than the data signal line driving circuit SD1 (refer also to FIG. 8(*a*)). The space holding a liquid crystal layer between the substrate and a counter substrate having a counter electrode COM as a part of display section is however not involved in image display. With the dummy wiring 3 formed in such an area, there created an additional capacitor section 7 with the dummy wiring 3 as one of electrodes, the counter electrode COM as the other electrode 4, and the liquid crystal layer as a dielectric substance 10. The additional capacitor section 7 operates as the wiring load adjustment section.

With the dummy wiring 3, the wiring load of the wiring 1 and the wiring load of the wiring 2 can be adjusted to be even, i.e., wiring loads for the first and second clock signals SCK1 and SCK2 become even. Thus, it is possible to keep difference in delay time between the first and second clock signals SCK1 and SCK2 within an allowable range, so that the proper phase relation between the first and second clock signals can be maintained. Consequently, sampling of image signal VIDEO can be properly carried out in the first data signal line driving circuit SD1, thus improving display quality.

Further, in this structure, the additional capacitor section 7 as the wiring load adjustment section is constituted of the original constituting members of the display device, thus minimizing increase of costs in providing the wiring load adjustment section.

Besides, in the liquid crystal display device of the present invention which includes a liquid crystal layer, the unevenness of wiring load is mainly caused by a capacitor generated between the liquid crystal layer and the counter electrode COM by the wiring 1*a* lead to the second data signal line driving circuit SD2 (refer to FIG. 1). Therefore, particularly for such a liquid crystal display device, the time constant between the wirings 1 and 2 can be adjusted to be even by having the foregoing arrangement in which the additional capacitor section 7 is formed by a capacitor constituted of the dummy wiring 3, the liquid crystal layer, and the counter electrode COM; and the dummy wiring 3 is formed on the wiring 2 by the same material as that of the wiring 1*a* so as to offer the same resistance R for the wiring 1 and the wiring 2. Thus, wiring load can be easily adjusted with this arrangement.

Figure 9:
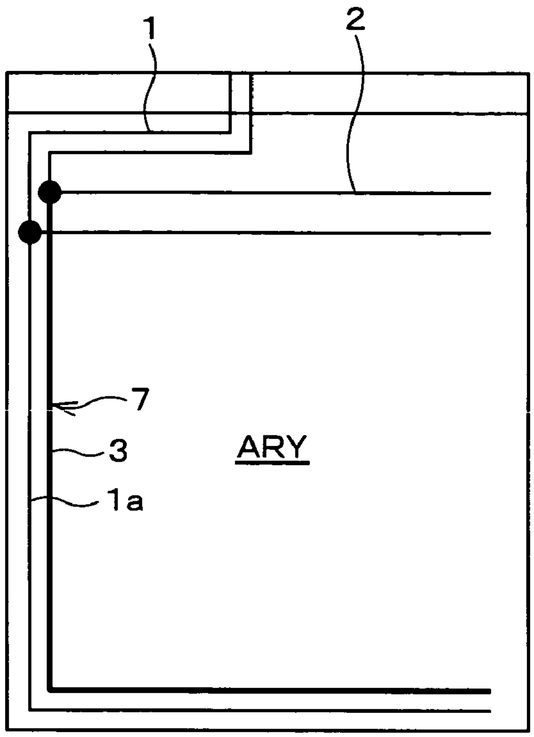
FIG. 9(*a*) is a plan view illustrating an example position of a capacitor constituting wiring load adjustment section by forming dummy wiring.
Figure 9:
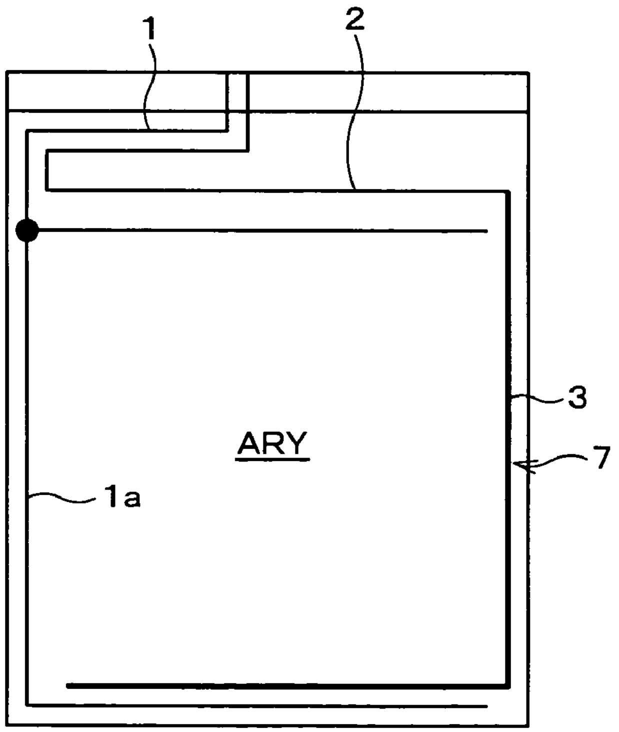
Figure 10:
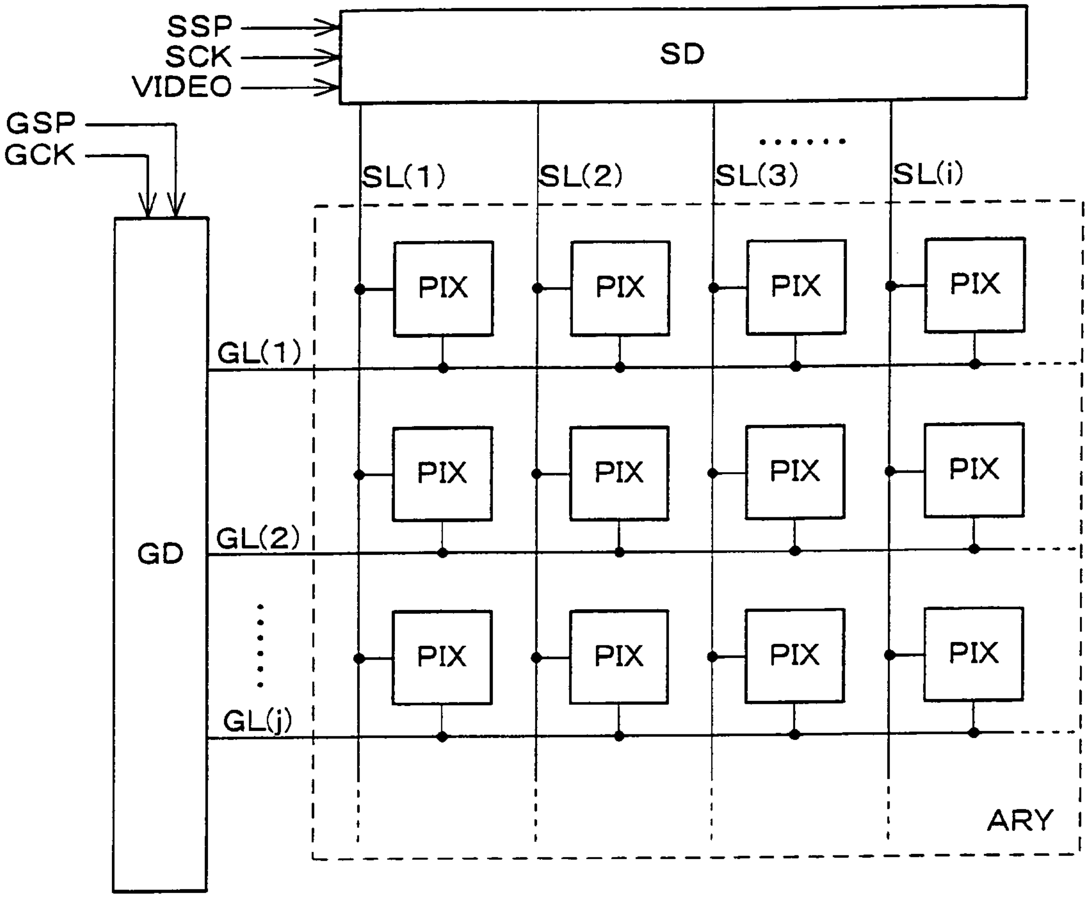
FIG. 10 (Prior Art)
FIG. 10 is a block diagram schematically illustrating a structure of a typical conventional liquid crystal display device.
Figure 11:
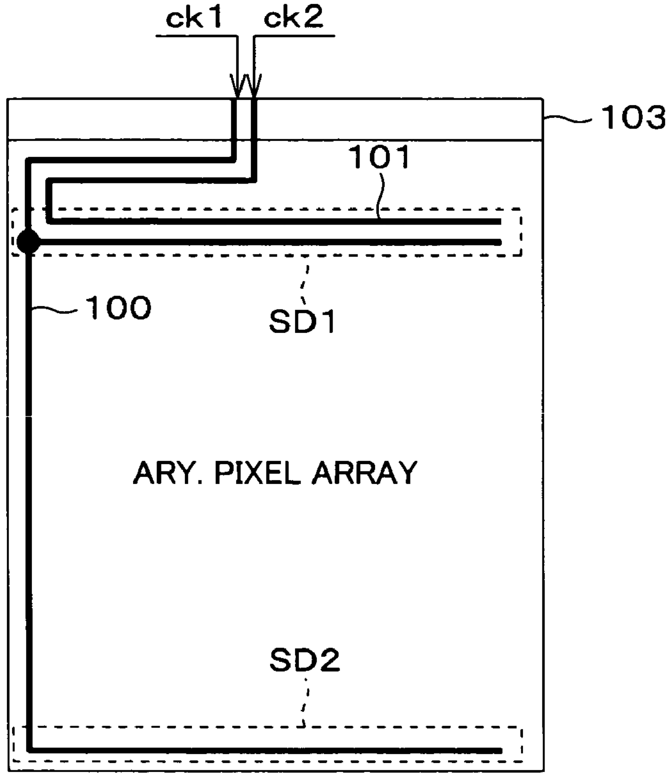
FIG. 11 is a plan view illustrating an arrangement of a liquid crystal display device including two data signal line driving circuit, in which the two data signal line driving circuits are both supplied with the same clock signal ck1 or ck2.
Figure 12:
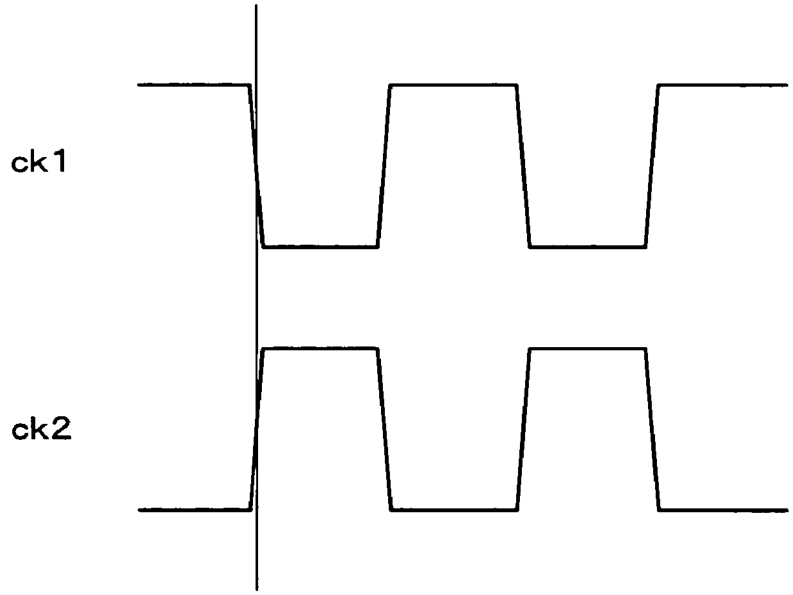
FIG. 12 is a waveform diagram of the clock signals ck1 and ck2 supplied to the foregoing two data signal line driving circuit.

Note that, the dummy wiring 3, which is formed in the foregoing structure in a fanfold shape on the vacant area close to the signal input section 5, can also be formed in a plate shape to be parallel with the counter electrode COM. Further, as shown in FIGS. 9(*a*) and 9(*b*), the dummy wiring 3 (denoted by a heavy line) can be formed in the periphery along the display section as the additional capacitor section 7. When thus forming the dummy wiring 3 along the wiring 1*a* leading to the second data signal line driving circuit SD2, or providing the dummy wiring 3 on the other side of the pixel array ARY to be symmetrical with the wiring 1*a*, it is possible to easily adjust the time constants of the wirings 1 and 2 to be even by providing the same length to the respective wirings, if the wirings are made of the same material and having the equal widths.

Further, as an alternative structure of the additional capacitor section 7 which is constituted of the dummy wiring 3, the liquid crystal layer, and the counter electrode COM in the foregoing example, the other electrode 4 shown in FIG. 8(*b*) constituting a capacitor with the dummy wiring 3 may be otherwise made of a transparent conductive film which is used for forming the pixel electrode (not shown) of the liquid crystal capacitor CL, or of a metal layer separately formed for providing intersection of wirings with a contact hole; and the dielectric substance 10 may be made of an interlayer insulation film between the dummy wiring 3 and the conductive film made of the transparent conductive film or the metal layer.

Further, the foregoing structure also allows use of a layer constituting a thin film transistor SW which is an active element formed on the pixel array ARY. In this case, as shown in FIG. 8(*c*), the other electrode 4 is created by adding impurities to a semiconductor layer 9 of the thin film transistor SW so as to provide the semiconductor layer 9 with a function similar to high-resistance metal so that the semiconductor layer 9 operating as an electrode; and the dielectric substance 10 is made of a gate insulation film 8 formed between the dummy wiring 3 and the semiconductor layer 9 with a metal-like characteristic.

In any of the foregoing structures, the additional capacitor section 7 can be made of the original constituting members of the display device, thus minimizing increase of costs in providing the additional capacitor section 7 as the wiring load adjustment section. Note that, the foregoing structures not using the liquid crystal layer and the counter electrode COM cause more difficulties than the structure using the liquid crystal layer in terms of adjustment of time constants for even wiring load; however, space for the liquid crystal layer and the counter electrode COM can be used for other members, thus offering more flexible layout.

As described, an active-matrix-type liquid crystal display device according to the present embodiment includes the additional capacitor section 7 for equalizing wiring loads of the first and second clock signals SCK1 and SCK2 (specifically, the wiring load of the wirings 1 and 2 for supplying the first and second clock signals SCK1 and SCK2) so that influence of difference in leading manner of the respective wirings can be prevented without processing the first and second clock signals SCK1 and SCK2 in an external circuit with higher power consumption, and desirable display quality can be obtained even with a structure in which only the first clock signal SCK1, which is one of the first and second clock signals SCK1 and SCK2 used in the first data signal line driving circuit SD1, is supplied in parallel to the second data signal line driving circuit SD2.

Note that, in the present embodiment, the other circuit where the first clock signal SCK1 supplied in parallel is the data signal line driving circuit SD2; however, the other circuit may be a pre-charging circuit for carrying out pre-charging of the data signal lines SL(1) through SL(i) in a retrace period so as to securely carry out writing of the data signal lines SL(1) through SL(i) in the next frame. Further, the two data signal line driving circuits SD1 and SD2 have different corresponding resolutions in the foregoing example; however, those two data signal line driving circuits may be a circuit for color display and for monochrome display, respectively. Further, the two data signal line driving circuits may be operated together so as to carry out superimpose display or the like. Further, the wiring load adjustment section may be provided in the scanning signal line driving circuit.

The basic concept of the present invention is to provide a dummy wiring 3 having the foregoing arrangement (can also be in a plate shape) for forming a capacitor so as to equalize wiring load between two related signals in a structure in which a plurality of signals related to each other (not necessarily 2 kinds) are supplied to at least one driving circuit (not necessarily a data signal line driving circuit), and at least one of the plurality of signals is lead in parallel to the other circuit (not necessarily a driving circuit).

Note that, in the present invention, the equalization of wiring load for the first and second signals, as a plurality of related signals, can be performed by providing even wiring load to the wirings 1 and 2; however, this arrangement is based on an objective of maintaining the originally designed phase relation between the second signal singly supplied and the first signal supplied in parallel to the other circuit, with equal delay times by wiring load. Accordingly, in an extreme example, the desired phase relation may be satisfied by greatly delaying one of the signals so as to delay the phase of the signal by 1 period.

Further, in the foregoing example, the first signals and the second signal, as the plurality of signals related to each other, are clock signals; however, the plurality of signals may also be digital image signals constituted of plural bits and divided into at least two bit groups. As a specific example, a digital image signal of 6 bits is supplied to the first data signal line driving circuit SD1, and the upper 3 bits of the 6 bits digital image signal is supplied to the second data signal line driving circuit SD2, so as to allow the respective data signal line driving circuits SD1 and SD2 to correspond to different gradations.

As with the case above, in order to simplify external interface, the image signal VIDEO in this example is broken into upper 3 bits and lower 3 bits, so as to supply only the upper 3 bits to the other circuit.

In this case, when the upper 3 bits and the lower 3 bits of the 6 bits digital image signal supplied to the first data signal line driving circuit SD1 have different wiring loads due to the described reason, sampling of digital image signals may fail due to change of phase relation in the first data signal line driving circuit SD1. In this case, use of the present invention allows adjustment of phase relation, thus properly operating the circuit without sampling failure.

Further, as described, the present invention is suitable for a structure in which the first signal is supplied to both the driving circuit and the other circuit from a common input terminal through a common signal line. With this structure, a conceivable benefit is reduction of the number of input terminals for input signals, thus allowing effective use of substrate area.

The display device of the present invention is preferably arranged so that the wiring load adjustment section adjusts time constants of the respective wirings of the first and second signals.

The adjustment of wiring load may be carried out with calculation using a time constant, in other words, a wiring capacitor value C, and a wiring resistance value R. The wiring capacitor C is calculated by using width and/or length of wiring constituting the capacitor and a specific inductive capacity of the dielectric substance held between the wirings. The capacitor value and the wiring resistance constituting wiring load can be adjusted by changing the width and/or length of wiring. Accordingly, the adjustment of wiring load can easily be carried out by equalizing time constants of respective wirings, given by an approximate expression of "time constant $\tau$=capacitor C*resistance R ($\tau$=CR)".

The display device of the present invention is preferably arranged so that the scanning signal lines and the data signal lines are formed on a substrate, and a liquid crystal layer is held between the substrate and a substrate having a counter electrode, the wiring load adjustment section uses the liquid crystal layer as a dielectric substance, and is constituted of dummy wiring connected to the wiring of the second signal which is supplied to the driving circuit and a liquid crystal layer on the dummy wiring, and the counter electrode.

The foregoing arrangement provides the dummy wiring to the wiring with smaller load, which is used for the second signal singly supplied to a driving circuit. The dummy wiring constitutes a wiring load adjustment capacitor, together with a counter electrode and a liquid crystal layer.

Such a wiring load adjustment section may be composed of original members of the display device, thus minimizing increase of cost for providing the wiring load adjustment section.

Further, in case of a liquid crystal display device including a liquid crystal layer, the unevenness of wiring load is mainly caused by a capacitor with an unignorable amount, which is generated between the liquid crystal layer and the counter electrode by the wiring for leading the first signal to the other circuit.

Therefore, with the foregoing arrangement of providing dummy wiring with an equal condition to that of the wiring for leading the first signal to the other circuit, it is possible to easily adjust the wiring load.

Further, the display device of the present invention is preferably arranged so that the scanning signal lines and the data signal lines are formed on a substrate where an interlayer insulation film and a conductive film are formed, and the wiring load adjustment section uses the interlayer insulation film as a dielectric substance, and is constituted of dummy wiring connected to the wiring of the second signal supplied to the driving circuit, the interlayer insulation film, and the conductive film.

The foregoing arrangement provides the dummy wiring to the wiring with smaller load, which is used for the second signal singly supplied to a driving circuit. The dummy wiring constitutes a wiring load adjustment capacitor, together with an interlayer insulation film and a conductive film.

The scanning signal lines and the data signal lines are thereon provided with pixel electrodes made of transparent conductive film etc., or a metal layer for making crossing of wirings, via the interlayer insulation film. With this structure, the foregoing capacitor may be created by using the interlayer insulation film as a dielectric substance and the conductive film as a counter electrode.

This wiring load adjustment section may also be composed of original members of the display device, thus minimizing increase of cost for providing the wiring load adjustment section.

The display device of the present invention is preferably arranged so that the scanning signal lines and the data signal lines have a thin film transistor for each intersection, and the wiring load adjustment section uses layers for constituting a gate insulation film of a thin film transistor as a dielectric substance, and is constituted of dummy wiring connected to the wiring of the second signal supplied to the driving circuit, and layers for constituting a gate insulation film and a semiconductor layer of a thin film transistor stacked on the dummy wiring.

The foregoing arrangement provides the dummy wiring to the wiring with smaller load, which is used for the second signal singly supplied to a driving circuit. The dummy wiring constitutes a wiring load adjustment capacitor, together with the layers for constituting a gate insulation film and a semiconductor layer of the thin film transistor stacked on the dummy wiring.

Respective intersections of the scanning signal lines and the data signal lines are often provided with thin film transistors operating as active elements. In this structure, the foregoing capacitor may be created with an electrode made of the semiconductor layer of the thin film transistor, supplied with impurities to have a function similar to high-resistance metal; and a dielectric substance made of the layer for constituting the gate insulation film included in the thin film transistor.

This wiring load adjustment section may also be composed of original members of the display device, thus minimizing increase of cost for providing the wiring load adjustment section.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display device, comprising:

a scanning signal line driving circuit for driving scanning signal lines;

a data signal line driving circuit for driving data signal lines intersecting the scanning signal lines, at least one of the scanning signal line driving circuit and the data signal line driving circuit being supplied with at least first and second signals, the first signal being supplied in parallel to other circuit than the driving circuit supplied with the first and second signals, the display device further comprising wiring load adjustment section for equalizing wiring load of the second signal which is supplied to the driving circuit, and wiring load of the first signal which is supplied in parallel to the driving circuit and the other circuit; wherein:

the scanning signal lines and the data signal lines are formed on a substrate, and a liquid crystal layer is held between the substrate and a substrate having a counter electrode, the wiring load adjustment section uses the liquid crystal layer as a dielectric substance, and is constituted of dummy wiring connected to the wiring of the second signal which is supplied to the driving circuit and a liquid crystal layer on the dummy wiring, and the counter electrode.

2. The display device as set forth in claim 1, wherein: the other circuit is a circuit for driving the scanning signal lines or the data signal lines.

3. The display device as set forth in claim 1, wherein: the first signal is supplied to the driving circuit and the other circuit from a common input terminal and through a common signal line.

4. The display device as set forth in claim 1, wherein: the first and second signals are clock signals of plural systems, respectively.

5. The display device as set forth in claim 1, wherein: the first and second signals are digital image signals constituted of a plurality of bits, and are divided into at least two bit groups.

6. The display device as set forth in claim 1, wherein: the wiring load adjustment section adjusts time constants of the respective wirings of the first and second signals.

7. The display device as set forth in claim 1, wherein: the dummy wiring is formed in a fanfold shape on a vacant area, which is an area holding the liquid crystal layer on the substrate having a counter electrode, and being provided as a part of a display section but is not involved in image display, the vacant area being closer to an end portion of the substrate than the data signal line driving circuit.

8. The display device as set forth in claim 1, wherein: the dummy wiring is formed in a plate shape to be in parallel with the counter electrode.

9. The display device as set forth in claim 1, wherein: the dummy wiring is formed in a periphery of a display section involved in image display.

10. The display device as set forth in claim 1, wherein: the other circuit is a pre-charging circuit for carrying out pre-charging of the data signal lines.

11. The display device as set forth in claim 1, wherein: the wiring load adjustment section is provided in the scanning signal line driving circuit.

12. A display device, comprising:

a scanning signal line driving circuit for driving scanning signal lines;

a data signal line driving circuit for driving data signal lines intersecting the scanning signal lines, at least one of the scanning signal line driving circuit and the data signal line driving circuit being supplied with at least first and second signals, the first signal being supplied in parallel to other circuit than the driving circuit supplied with the first and second signals, the display device further comprising wiring load adjustment section for equalizing wiring load of the second signal which is supplied to the driving circuit, and wiring load of the first signal which is supplied in parallel to the driving circuit and the other circuit; wherein:

the scanning signal lines and the data signal lines are formed on a substrate where an interlayer insulation film and a conductive film are formed, and the wiring load adjustment section uses the interlayer insulation film as a dielectric substance, and is constituted of dummy wiring connected to the wiring of the second signal supplied to the driving circuit, the interlayer insulation film, and the conductive film.

13. The display device as set forth in claim 12, wherein: the dummy wiring is formed in a periphery of a display section involved in image display.

14. The display device as set forth in claim 12, wherein: the other circuit is a circuit for driving the scanning signal lines or the data signal lines.

15. The display device as set forth in claim 12, wherein: the first signal is supplied to the driving circuit and the other circuit from a common input terminal and through a common signal line.

16. The display device as set forth in claim 12, wherein: the first and second signals are clock signals of plural systems, respectively.

17. The display device as set forth in claim 12, wherein: the first and second signals are digital image signals constituted of a plurality of bits, and are divided into at least two bit groups.

18. The display device as set forth in claim 12, wherein: the wiring load adjustment section adjusts time constants of the respective wirings of the first and second signals.

19. A display device, comprising:

a scanning signal line driving circuit for driving scanning signal lines;

a data signal line driving circuit for driving data signal lines intersecting the scanning signal lines, at least one of the scanning signal line driving circuit and the data signal line driving circuit being supplied with at least first and second signals, the first signal being supplied in parallel to other circuit than the driving circuit supplied with the first and second signals, the display device further comprising wiring load adjustment section for equalizing wiring load of the second signal which is supplied to the driving circuit, and wiring load of the first signal which is supplied in parallel to the driving circuit and the other circuit; wherein:

the scanning signal lines and the data signal lines have a thin film transistor for each intersection, and the wiring load adjustment section uses layers for constituting a gate insulation film of a thin film transistor as a dielectric substance, and is constituted of dummy wiring connected to the wiring of the second signal supplied to the driving circuit, and layers for constituting a gate insulation film and a semiconductor layer of a thin film transistor stacked on the dummy wiring.

20. The display device as set forth in claim 19, wherein: the dummy wiring is formed in a periphery of a display section involved in image display.

21. The display device as set forth in claim 19, wherein: the other circuit is a circuit for driving the scanning signal lines or the data signal lines.

22. The display device as set forth in claim 19, wherein: the first signal is supplied to the driving circuit and the other circuit from a common input terminal and through a common signal line.

23. The display device as set forth in claim 19, wherein: the first and second signals are clock signals of plural systems, respectively.

24. The display device as set forth in claim 19, wherein: the first and second signals are digital image signals constituted of a plurality of bits, and are divided into at least two bit groups.

25. The display device as set forth in claim 19, wherein: the wiring load adjustment section adjusts time constants of the respective wirings of the first and second signals.

* * * * *